United States Patent
Destain

(10) Patent No.: US 8,684,532 B2
(45) Date of Patent: Apr. 1, 2014

(54) SYSTEM AND METHOD FOR GENERATING MULTICOLOR SCAN LINES AND MULTICOLOR PROJECTION VIDEO DISPLAY INCORPORATING THE SAME

(75) Inventor: Patrick R. Destain, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 865 days.

(21) Appl. No.: 11/948,326

(22) Filed: Nov. 30, 2007

(65) Prior Publication Data

US 2009/0073527 A1 Mar. 19, 2009

Related U.S. Application Data

(60) Provisional application No. 60/973,628, filed on Sep. 19, 2007.

(51) Int. Cl.
*G03B 21/26* (2006.01)
(52) U.S. Cl.
USPC .......................................................... 353/30
(58) Field of Classification Search
USPC ........... 348/195, 196, 206, 210, 99, 739–771; 353/30, 94, 81; 359/204.1, 209, 621, 359/196.1–216.1; 385/28
See application file for complete search history.

(56) References Cited

U.S. PATENT DOCUMENTS

| | | | |
|---|---|---|---|
| 4,862,196 A * | 8/1989 | Umeda et al. | 347/232 |
| 5,570,140 A * | 10/1996 | Toide et al. | 348/744 |
| 5,963,354 A * | 10/1999 | Shiraishi et al. | 359/204.1 |
| 5,990,990 A * | 11/1999 | Crabtree | 349/74 |
| 6,540,362 B1 * | 4/2003 | Janssen | 353/31 |
| 6,771,419 B1 * | 8/2004 | Yamagishi et al. | 359/457 |
| 7,419,269 B2 * | 9/2008 | Kojima | 353/84 |
| 7,447,402 B2 * | 11/2008 | Sonoda et al. | 385/31 |
| 2006/0279710 A1 * | 12/2006 | Tani | 353/85 |

OTHER PUBLICATIONS

Patrick R. Destain, "An Optical Architecture Having a Rotating Polygon for Use in Imaging Systems" U.S. Appl. No. 11/856,012, filed Sep. 14, 2007.

* cited by examiner

*Primary Examiner* — Thanh Luu
*Assistant Examiner* — Danell L Owens
(74) *Attorney, Agent, or Firm* — Warren L. Franz; Wade J. Brady, III; Frederick J. Telecky, Jr.

(57) ABSTRACT

A system for, and method of, generating multicolor scan lines and a multicolor projection video display (PVD) incorporating the system or the method. In one embodiment, the system includes: (1) light sources that emit light of different colors at different emission locations and (2) first and second lenses having lenticular arrays associated therewith and configured to receive the light of the different colors and generate multicolor scan lines therefrom, the emission locations separated by different distances from the first lens.

20 Claims, 5 Drawing Sheets

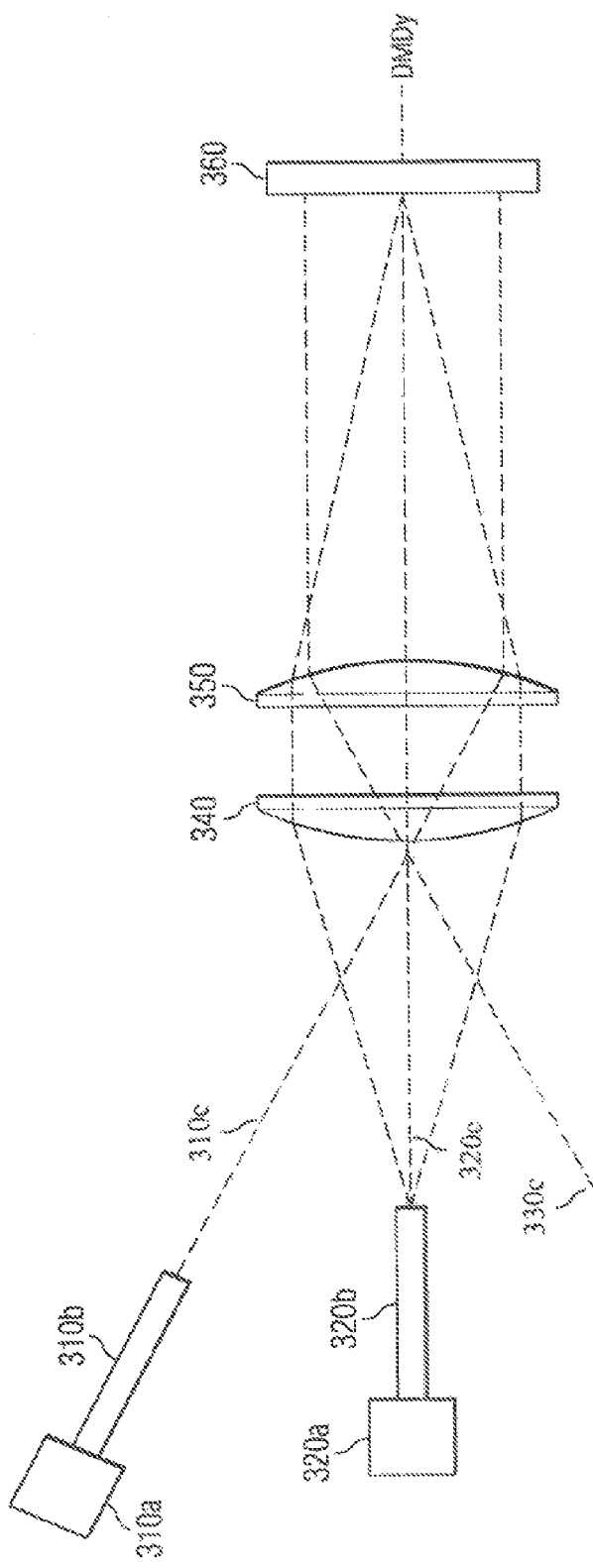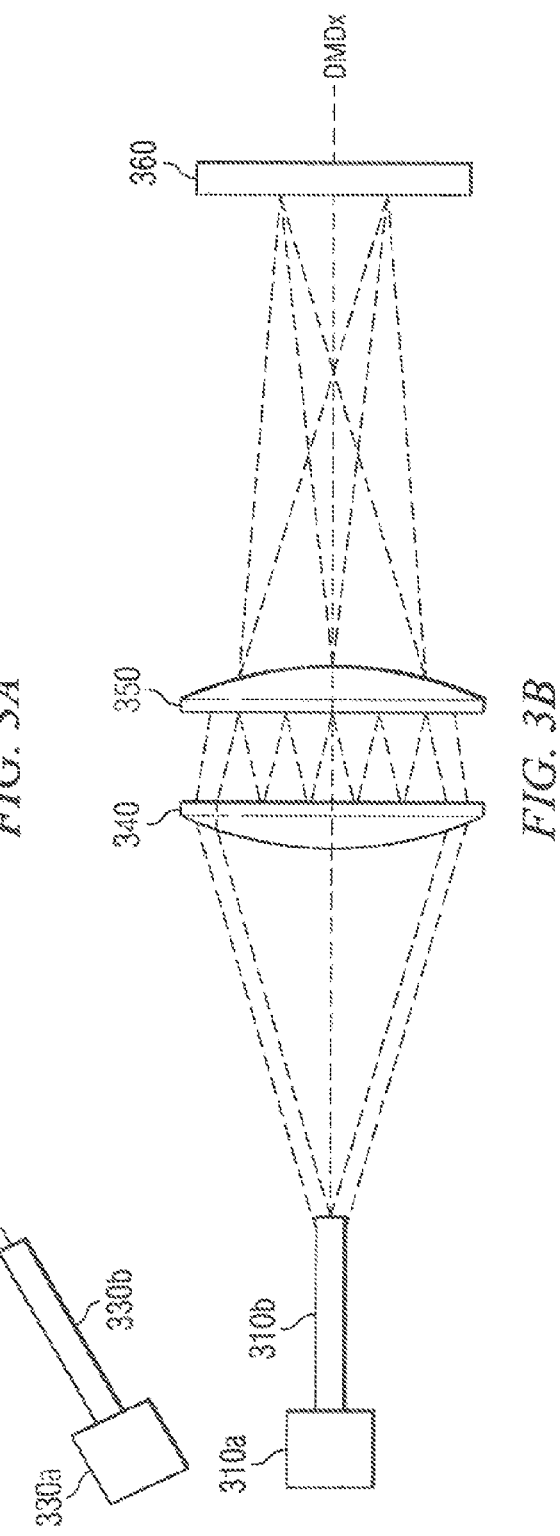

SYSTEM AND METHOD FOR GENERATING MULTICOLOR SCAN LINES AND MULTICOLOR PROJECTION VIDEO DISPLAY INCORPORATING THE SAME

CROSS-REFERENCE TO PROVISIONAL APPLICATION

This application claims the benefit of U.S. Provisional Application Ser. No. 60/973,628, entitled "Line Array Generator Engine (LAGE) for Dynamic Bright Scroller," filed on Sep. 19, 2007 by Destain, commonly assigned with the invention and incorporated herein by reference.

TECHNICAL FIELD OF THE INVENTION

The invention is directed, in general, to multicolor projection video displays (PVDs) and, more specifically, to a system and method for generating multicolor scan lines and multicolor PVD incorporating the same.

BACKGROUND OF THE INVENTION

Multicolor PVDs based on digital micro-mirror devices (DMDs) have become quite popular owing, in part, to their accurate color rendition, resolution, display size and overall cost. One important aspect of any video display system is its intensity—the ability to produce bright whites and vivid colors. In DMD-based projection systems, this means a bright light source and an efficient way to convey light from the light source to a screen.

Because the DMD itself is a relatively large part of the overall cost of a PVD, most of today's commercially available PVDs use a single DMD. Of those, most employ a white light source and filter the resulting white light through a color wheel that rotates among several colors. The single DMD renders each video frame color-by-color. However, the rendering rate is so high that the human eye perceives a full palette of colors for each frame.

The next generation DMD-based PVDs continue to employ a single DMD, but use as their light source multiple, separate, colored light sources, e.g., red, green and blue light sources. Often these colored light sources are lasers, noted for their intensity, efficiency, extremely low étendue, lifespan and color stability. While colored light sources offer significant advantages over a white light source and color wheel, it is apparent that the DMD has only a minor fraction of the dwell time of each frame (the reciprocal of the frame rate) to render a particular color. As a result, the majority of the light produced by each light source is lost or otherwise unusable, and the overall intensity of the system is less than perhaps it could be.

While the more recent DMD-based PVDs are well regarded, a simpler and lower cost optical system for conveying light through a DMD-based PVD would be beneficial. A method of generating so-called scan lines and a multicolor PVD employing such optical system or method would also be beneficial.

SUMMARY OF THE INVENTION

To address the above-discussed deficiencies of the prior art, one aspect of the invention provides a system for generating multicolor scan lines. In one embodiment, the system includes: (1) light sources that emit light of different colors at different emission locations and (2) first and second lenses having lenticular arrays associated therewith and configured to receive the light of the different colors and generate multicolor scan lines therefrom, the emission locations separated by different distances from the first lens.

Another aspect of the invention provides a method of generating multicolor scan lines. In one embodiment, the method includes: (1) emitting light of different colors from light sources at different emission locations, (2) receiving the light of the different colors into a first lens having a lenticular array associated therewith, the emission locations separated by different distances from the first lens and (3) thereafter receiving the light of the different colors into a second lens having a lenticular array associated therewith.

Yet another aspect of the invention provides a multicolor PVD. In one embodiment, the multicolor PVD includes: (1) light sources that emit light of different colors at different emission locations, (2) first and second lenses having lenticular arrays associated therewith and configured to receive the light of the different colors and generate multicolor scan lines therefrom, the light sources including optical fibers that have ends located at the different emission locations separated by different distances from the first lens and are tilted with respect to one another such that principal rays emitted therefrom converge on a focal plane of the second lens, (3) a polygonal prism configured to receive the multicolor scan lines and cause the multicolor scan lines to scroll thereby yielding scrolling multicolor scan lines, (4) a projection lens, (5) a DMD configured to receive and reflect portions of the multicolor scan lines toward or away from the projection lens, (6) DMD control circuitry coupled to the DMD and configured to control the DMD in response to data derived from a video stream and (7) a projection screen configured to receive images emitted from the projection lens.

BRIEF DESCRIPTION OF THE DRAWINGS

For a more complete understanding of the invention, reference is now made to the following descriptions taken in conjunction with the accompanying drawings, in which:

FIGS. 3A and 3B are views taken respectively along XZ and YZ planes of a parametric optical layout of one embodiment of a system for generating multicolor scan lines constructed according to the principles of the invention;

DETAILED DESCRIPTION

Before describing specific embodiments, it should be noted that the system and method for generating multicolor scan lines disclosed herein can be used in conjunction with any conventional or later-developed microdisplay, including spatial light modulators (SLMs) such as liquid-crystal-on-silicon (LCoS) devices, liquid crystal displays (LCDs) and DMDS.

Figure 1:
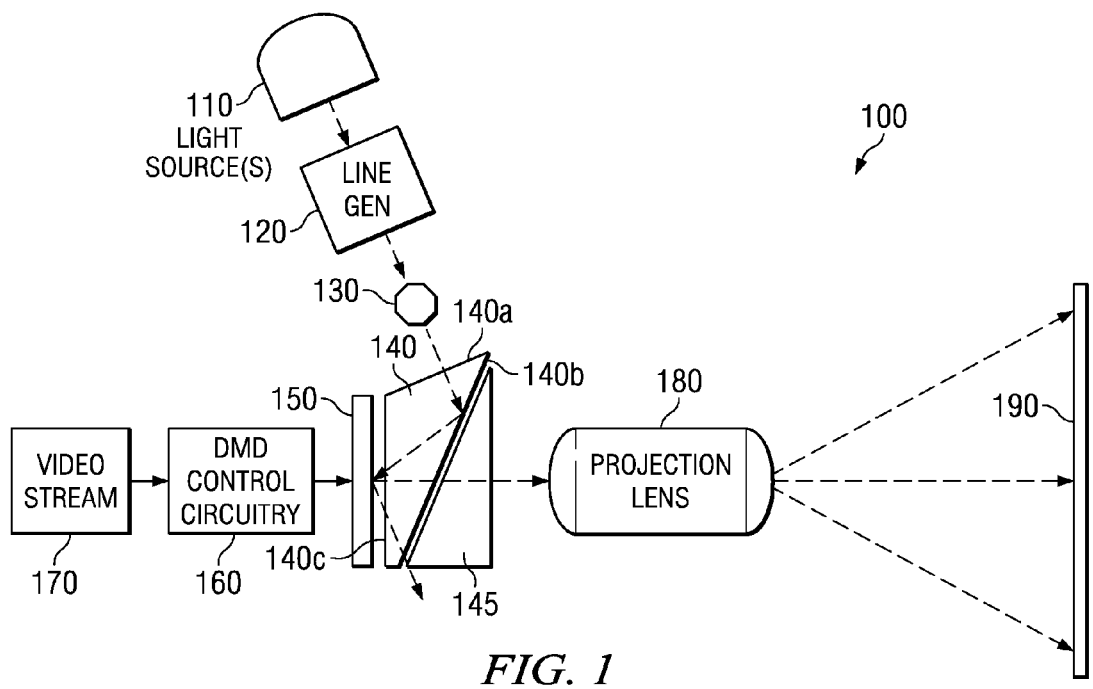
FIG. 1 is a block diagram of one embodiment of a multicolor PVD incorporating a system or method for generating multicolor scan lines constructed according to the principles of the invention.

FIG. 1 is a block diagram of one embodiment of a multicolor PVD, generally designated 100, incorporating a system or method for generating multicolor scan lines constructed according to the principles of the invention. FIG. 1 in general shows an example of an optical path through the system 100. For simplicity's sake, FIG. 1 shows only the principal ray of that optical path in broken line.

One or more light sources 110 generate light. The light source(s) 110 may be a single source that produces broadband (e.g., white) light and filters that filter the broadband light to yield narrowband light of different colors or may be a combination of several (e.g., three or more) separate sources that each produce narrowband light of a different color. In one embodiment, the light source(s) 110 are three separate sources of colored light (e.g., red, green and blue; yellow, magenta and cyan; or another three colors) that when mixed in various proportions yield a broad palette of colors to enable a multicolor video display system. In the illustrated embodiment, the light source(s) 110 are three lasers, one each for red, green and blue light.

A system 120 for generating multicolor scan lines is associated with the light source(s) 110. In a manner that will be described in detail below, the system 120 receives the light produced by the light source(s) 110 and creates multiple scan lines of a certain width and separated from one another by a certain distance, and each of a different color. In the illustrated embodiment, the scan lines are relatively uniform in length, width, separation and intensity.

The system 120 provides the multicolor scan lines to a polygonal prism 130 that has a predetermined index of refraction and rotates about an axis substantially parallel to the lines. The scan lines pass into the polygonal prism 130 through an input face thereof, through the polygonal prism 130 and out of the polygonal prism 130 through an output face thereof, with the rotation of prism 130 causing them to scroll with respect to a fixed target surface in a direction normal to the axis. The geometry, construction and use of various possible embodiments of the polygonal prism 130 may be found in U.S. patent application Ser. No. 11/856,012, filed by Destain on Sep. 14, 2007, entitled "An Optical Architecture Having a Rotating Polygon for Use in Imaging Systems," commonly assigned with the invention and incorporated herein by reference.

The scrolling, multicolor scan lines then enter a DMD prism 140 that has a predetermined index of refraction. In the illustrated embodiment, the scan lines enter the DMD prism 140 substantially normal to a first face 140a, causing their paths to remain substantially straight. The scan lines then totally internally reflect off a second face 140b of the DMD prism 140 because their angles of incidence exceed the critical angle. The scan lines then exit the DMD prism 140 through a third face 140c because their angles of incidence are less than the critical angle.

The reflected, scrolling, multicolor scan lines then strike the mirrored surface of a DMD 150. Those skilled in the pertinent art understand that a DMD has a reflective, mirror face that comprises at least thousands, and typically millions, of individually tiltable micro-mirrors (not shown). The mirrors can be tilted between two extreme angles (e.g., ±12° from a central, untilted position) to reflect light in desired directions. In the embodiment of FIG. 1, DMD control circuitry 160 controls the tilt of each mirror in response to data derived from a video stream 170, which amounts to a sequence of still video frames.

Depending upon the content of the video stream and the color being rendered at a given time, the mirrors reflect portions of the scan lines back through the DMD prism 140, through a second DMD prism 145 and toward a projection lens 180 or away from the projection lens 180 (as an unreferenced, downward-pointing, broken-line arrow indicates), typically toward a light-absorbing body (not shown).

The portions of the scan lines that enter the projection lens 180 are caused to diverge as they exit the projection lens 180 and travel toward a projection screen 190, which may be a rear-projection (translucent) screen or a front-projection (opaque) screen. An image is formed on the projection screen 190. The image forms as a function of the content of the video stream 170.

Figure 2:
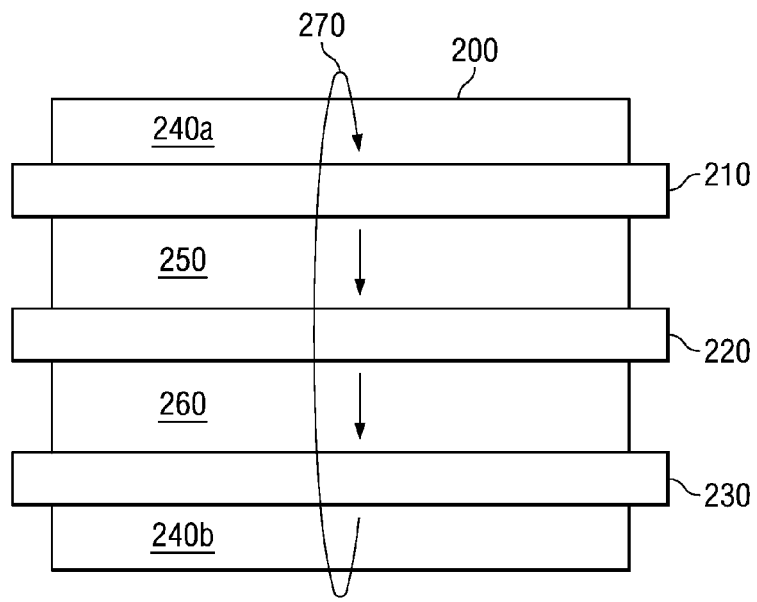
FIG. 2 is a diagram of a face of a DMD on which is projected multicolor scan lines.

FIG. 2 is a diagram of a face 200 of a DMD, e.g., the DMD 150, on which is projected multicolor scan lines. The face 200 is rectangular and has an aspect ratio of 16:9, though the invention is not limited to a particular size, shape or aspect ratio of DMD face.

Three example multicolor scan lines are projected on the DMD face 200: a green line 210, a blue line 220 and a red line 230. The scan lines 210, 220, 230 are relatively uniform in length and width. The three lines 210, 220, 230 are separated by dark regions. Given the current position of the scan lines 210, 220, 230, one of the dark regions is temporarily split into subregions 240a, 240b. Two other regions 250, 260 are intact in FIG. 2. As arrows 270 schematically indicate, the lines scroll vertically as FIG. 2 is oriented. Likewise, the dark regions 240a, 240b, 250, 260 scroll. In FIG. 2, the scan lines 210, 220, 230 scroll downward until they reach the bottom of the face 200, at which time they scroll back to the top of the face 200, and so on. The dark regions 240a, 240b, 250, 260 provide time for DMD control circuitry (e.g., the DMD control circuitry 160 of FIG. 1) to reconfigure (retilt) the mirrors in the dark regions 240a, 240b, 250, 260 to ready them for the next scan line to pass over them. Thus, the DMD face 200 simultaneously reflects (renders) three colors 210, 220, 230 and reconfigures mirrors in the dark regions 240a, 240b, 250, 260 in a scrolling manner.

FIGS. 3A and 3B are views taken respectively along XZ and YZ planes of a parametric optical layout of one embodiment of a system for generating multicolor scan lines constructed according to the principles of the invention. The layout employs lenses having lenticular arrays in a configuration that takes advantage of the fact that the light source(s) consists of lasers and optical fibers or other low-étendue sources.

Referring first to FIG. 3A, three lasers 310a, 320a, 330a constitute the light source(s) 110 of FIG. 1. Three corresponding optical fibers 310b, 320b, 330b convey light from the three lasers 310a, 320a, 330a. The light emerges from the ends of the optical fibers 310b, 320b, 330b (the ends being the different emission locations of the light sources) in the form of three diverging beams that have low étendue. For simplicity's sake, FIG. 3A shows only the principal ray from the optical fibers 310b, 330b; both principal and peripheral rays from the optical fiber 320b are shown. A first lens 340 receives the light in the three beams on a convex surface thereof, collimating the beams. A second lens 350 receives light from the first lens 340, causing it to converge as it exits a convex surface thereof and form an image consisting of three scan lines of different colors on a surface 360. The surface may be that of a field lens, a polygonal prism or any other surface.

FIG. 3A shows that the ends, and the rays emitting from the ends, of the three optical fibers 310b, 320b, 330b are not parallel; in fact they are tilted with respect to one another such that their principal rays converge on a focal plane (not separately referenced) of the second lens 350. The ends of the three optical fibers 310b, 320b, 330b need not be tilted with respect to one another. Instead, they may be parallel with one another, in which case the pupil shift is performed by a decenter field lens or prismatic wedges for the outer sources (not shown).

FIG. 3A also shows that the ends (the different emission locations) of at least some of the three optical fibers 310b, 320b, 330b are separated from the focal plane of the second lens 350 by different distances. The relative axial distances between the ends of each of the three optical fibers 310b, 320b, 330b and the focal plane of the second lens 350 are such that some, and preferably substantially all, chromatic focal shift dependency in the first and second lenses 340, 350 is nullified. As a result, axial color shifts may be substantially canceled, and any need for relatively expensive doublets or glass to correct color effects may be eliminated. This allows many relatively economical kinds of glass or plastic to be used to construct the first and second lenses 340, 350.

The first and second lenses 340, 350 have lenticular arrays. As those skilled in the pertinent art are familiar, lenticular arrays are arrays of convex cylindrical "cells" that are designed such that they cooperate to steer light passing through them in a specific manner along one particular axis. Lenticular arrays are often used to redistribute (e.g., average) light spatially, for example to compensate for spatial intensity variations in a beam of light. In the embodiment of FIGS. 3A and 3B, the first and second lenses 340, 350 are used to transform the three generally circular beams of light emitted from the optical fibers 310b, 320b, 330b into scan lines of uniform intensity and different color. Although a general discussion of lenticular arrays is outside of the scope of this disclosure, details regarding embodiments of their geometry will be set forth below in conjunction with FIG. 5.

As stated above, FIG. 3B is a side view of the system. It may now be seen that the ends of the three optical fibers 310b, 320b, 330b are arranged in a vertical plane. Although the scale of FIGS. 3A and 3B does not allow it to be shown in great detail, it may also be seen that the cells of the lenticular arrays of the first and second lenses 340, 350 are elongated horizontally; they form a single column having multiple rows. As a result, the scan lines that are formed at the surface 360 are parallel to each of the cells, which is in accordance with the optical theory underlying lenticular arrays.

The specific layout of FIGS. 3A and 3B has several advantages. First, as described above, the ends (the different emission locations) of the middle and the two outer ones of the three optical fibers 310b, 320b, 330b are separated from the focal plane of the second lens 350 by different distances. As those skilled in the pertinent art are aware, chromatic dispersion resulting from power variation (focal) in a lens is wavelength dependent and so affects the first order characteristics (magnification and image plane location) for each color of light differently. In the layout of FIGS. 3A and 3B, the axial intensity distribution of each color may be independently adjusted by increasing or decreasing the distance between the different emission locations of the light sources delivering that color and the focal plane of the second lens 350.

Second, because color-dependent lens dispersion can be compensated, lower cost materials (e.g., plastic, such as polymethyl methacrylate, instead of glass) may be used for the first and second lenses 340, 350. This reduces the overall cost of the system.

Third, and as described above, the ends, and the rays emitted from the ends, of the three optical fibers 310b, 320b, 330b are tilted with respect to one another such that their principal rays converge on a focal plane of the second lens 350. Tilting the ends of the optical fibers 310b, 320b, 330b in such manner can eliminate the need for a field lens for the first lens 340 or provide a simple way to image the exit pupil in an arbitrary plane. (A field lens would otherwise be needed to obtain a telecentric image.) It has been found that tilting the ends of the optical fibers 310b, 320b, 330b to such a degree does not significantly affect focus.

In one embodiment, the ends of the three optical fibers 310b, 320b, 330b are tilted with respect to one another such that the exit pupil plane can be placed at an arbitrary point. As a result, a field lens may no longer be needed for the polygonal prism 130. To avoid the field lens, the ends should be tilted such that the pupil is imaged at the output face of the polygonal prism 130. This further reduces the number of lenses required to convey light from the light source(s) to the DMD and potentially decreases the complexity and cost of the overall system without significantly degrading optical performance.

Fourth, the layout is highly symmetrical. As a result, line distortion is negligible in the illustrated embodiment.

Figure 4:
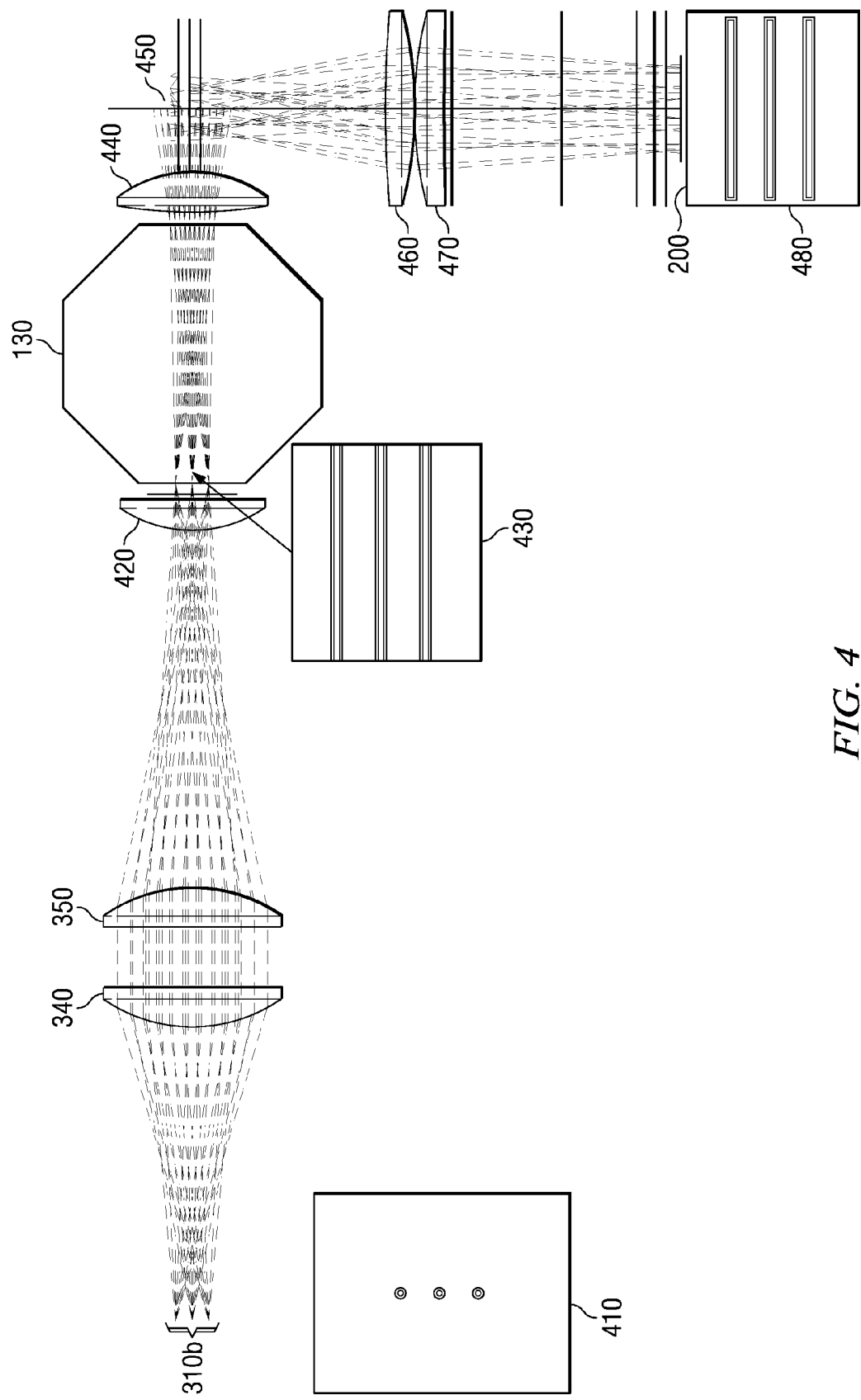
FIG. 4 is a diagram of one embodiment of a system for generating multicolor scan lines constructed according to the principles of the invention.

FIG. 4 is a diagram of one embodiment of a system for generating multicolor scan lines constructed according to the principles of the invention. FIG. 4 shows principal and peripheral rays of all three colored beams of light. FIG. 4 also shows cross-sections of the three beams taken at three locations.

A first cross-section 410 shows the three colored beams of light as they emerge from the ends of the optical fibers 310b, 320b, 330b. The three colored beams of light are generally circular in cross-section and highly localized. As FIG. 4 shows, the three colored beams of light diverge in three overlapping cones until they reach the first lens 340. Collimated by the convex surface and transformed by the lenticular array of the first lens 340, the beams travel to the second lens 350, where they are further transformed by its lenticular array and caused by its convex surface to converge toward an image.

The surface 360 of FIG. 3 takes the form of a field lens 420 in FIG. 4. A second cross-section 430 bears out the fact that the beams are now in the form of three scan lines of different color. The focusing lens 420 prepares the scan lines to enter the input face of the polygonal prism 130, which transforms them into scrolling scan lines. A collimation lens 440 coincident with the pupil image plane position receives the scrolling scan lines.

A folding mirror 450 and three dichroic mirrors receive and reflect the scrolling scan lines, folding the optical path to accommodate system cabinet constraints and rotate the scrolling scan lines for the particular embodiment of FIG. 4. FIG. 4 illustrates just this one folding mirror 450; however, those skilled in the pertinent art should understand that other folding mirrors may be added to the optical path without materially changing its performance. In fact, although FIG. 4 does not so illustrate, an additional folding mirror may be placed between the emission locations of the light sources and the first lens 340. A detector for monitoring multicolor light output may be placed behind that folding mirror. Such detector will be discussed in conjunction with FIG. 6.

Further lenses 460, 470 focus the scrolling scan lines (previously collimated through the collimation lens 440). A third cross-section 480 demonstrates that the three scan lines are, in fact, properly imaged on the DMD face 200. Of course, the third cross-section 480 does not indicate that the three scan lines are scrolling.

Figure 5:
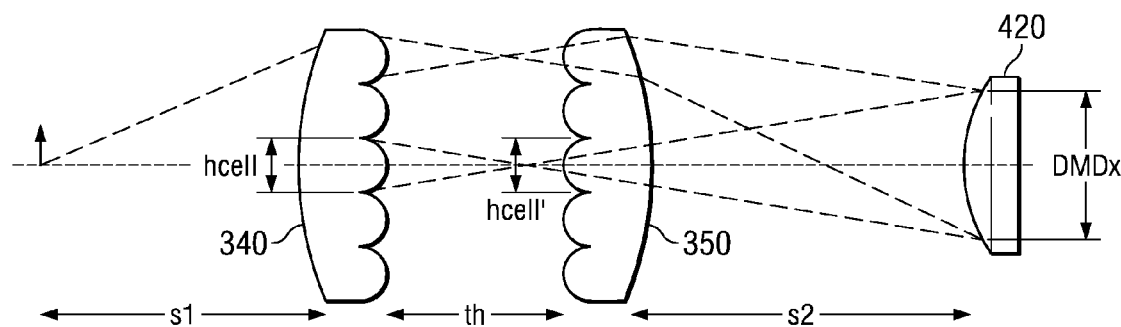
FIG. 5 is a diagram of two lenses of FIGS. 2 and 4.

FIG. 5 is a diagram of the first and second lenses 240, 250 of FIGS. 2 and 4. FIG. 5 is presented primarily for the purpose of describing one way in which the cells in the lenticular arrays of the first and second lenses 240, 250 may be designed.

Assuming the input beam exit pupil is at infinity (its principal rays are parallel to each other) and any field lens that may exist between the first and second lenses 340, 350 and the polygonal prism 130 receives all lines generated by the first and second lenses 340, 350, the parametric design is subject to two constraints: (1) the DMD scanning height and (2) the maximum aperture value (f number) of the polygonal prism, including any associated field lens(es). The following basic trigonometric relationships apply to a first-order approximation of the parametric design:

$$\frac{s1}{s2} = 2*N.A*fnum, \quad (1)$$

$$\frac{s2}{th} = \frac{DMDx}{hcell}, \quad (2)$$

$$s2 = fl, \text{ and} \quad (3)$$

$$fl = \text{poly\_dia} * \frac{N-1}{N}, \quad (4)$$

where s1 is the distance between the end of the optical fiber and the first lenticular lens 340, s2 is the distance between the second lenticular lens 340 and the 360, N.A is the numerical aperture of the optical fiber, fnum is the maximum aperture value (f number) compatible with the polygonal prism, th is the distance between the first lenticular lens 340 and the second lenticular lens 350, DMDx is the DMD scanning height, hcell is the height of the cells in the first and second lenses 340, 350, fl is the focal length of the second lens 350, poly_dia is the diameter of the polygonal prism 130 of FIG. 1 and N is the index of refraction of the polygonal prism 130.

Substituting Equations (3) and (4) into Equation (1) and solving for s1 yields:

$$s1 = 2*N.A*fnum*\text{poly\_dia}*\frac{N-1}{N} \quad (5)$$

Substituting Equations (3) and (4) into Equation (2) and solving for $$\frac{hcell}{th}$$

yields:

$$\frac{hcell}{th} = \frac{DMDx*N}{\text{poly\_dia}*(N-1)} \quad (6)$$

Array_sampling is defined as the number of cells constituting the lenticular array in each of the first and second lenses 340, 350. Equation (7) gives array_sampling:

$$\text{array\_sampling} \sim \frac{2*N.A^2*fnum*\text{poly\_dia}*(N-1)}{N*hcell} \quad (7)$$

Equation (7) has an infinite solution set given a particular array_sampling. Therefore, Equation (7) enables one skilled in the pertinent art to make and practice a variety of embodiments of the first and second lenses 340, 350.

Figure 6A:
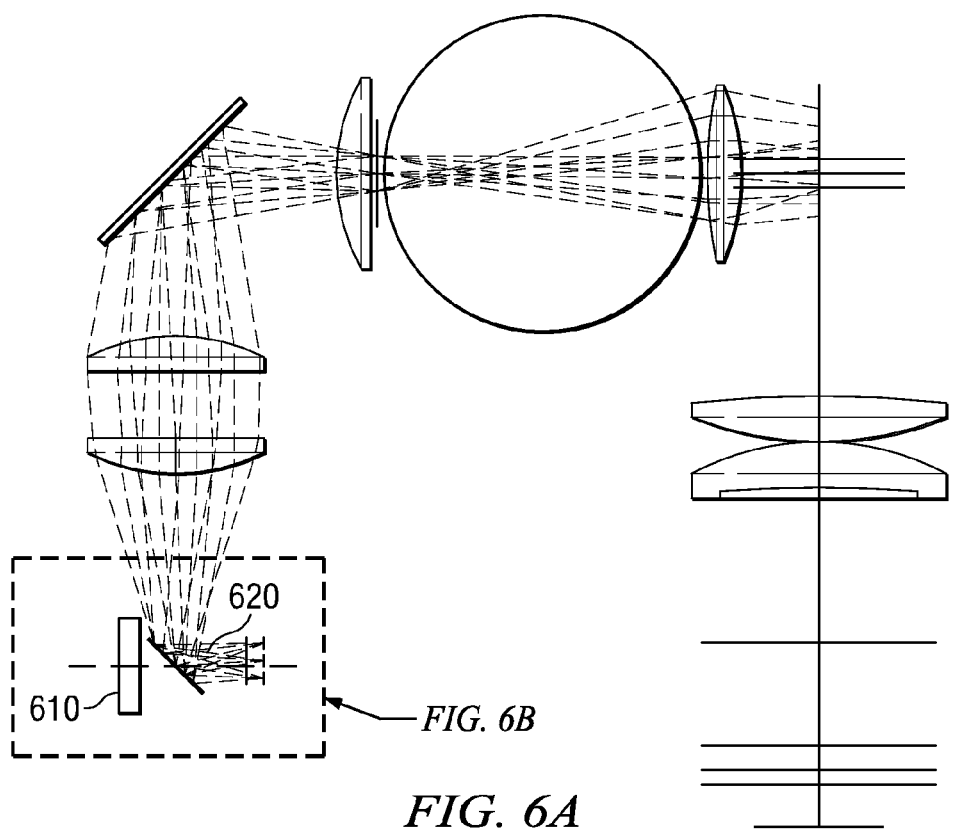
FIG. 6 is a diagram of one embodiment of a detector for monitoring multicolor light output employable in the system of FIG. 4.
Figure 6B:
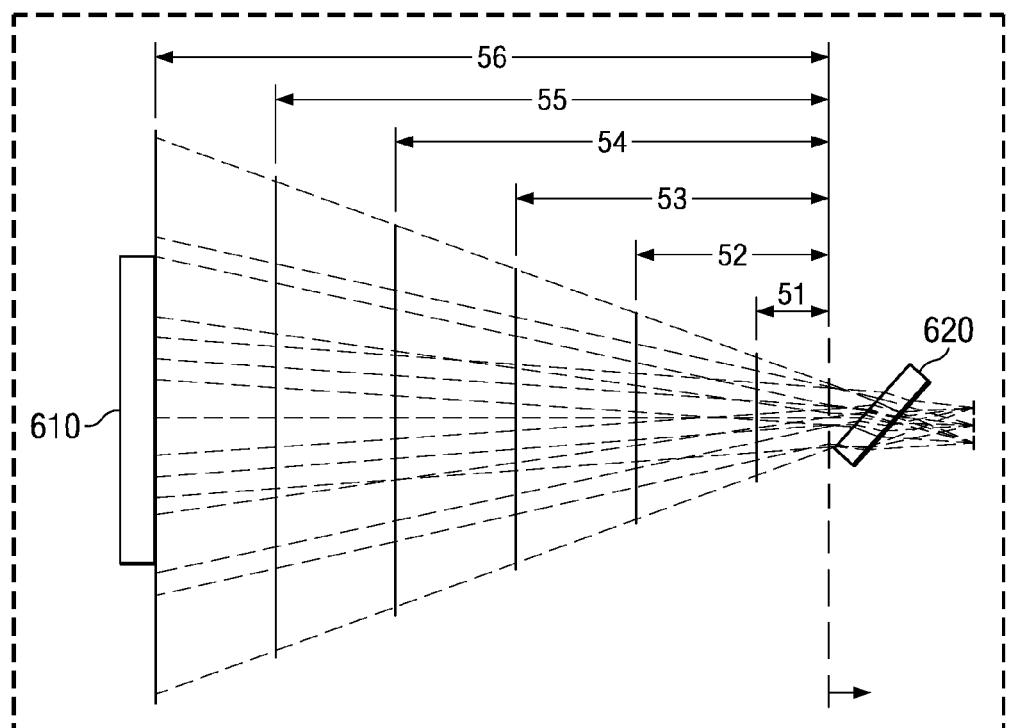

FIG. 6A and 6B illustrate one embodiment of a detector 610 for monitoring multicolor light output employable in the system of FIG. 4. The detector 610 may advantageously monitor the laser flux output stability for each color. The fraction of light provided to the detector 610 depends upon the detector's dynamic response. In one embodiment, the detector 610 is 1 mm² and has a dynamic response such that it should receive about 0.00005 (0.005%) of the laser output.

It will be recalled from the discussion above that a folding mirror may be located between the emission locations of the light sources and the first lens 340. The folding mirror, referenced as 620 in FIG. 6, does not reflect 100% of the light incident on it. The detector 610 may therefore be placed behind the folding mirror 620 to receive light that would otherwise have been lost. The detector 610 may be employed to monitor multicolor light output ultimately to control or compensate for variations in the multicolor light output.

Although the invention does not so require, placing the detector 610 in accordance with FIG. 6A and 6B has several advantages. First, no additional lenses are needed. Second, in the embodiment of FIG. 4, the distance separating the emission locations and the detector 610 is relatively small, perhaps on the order of 6 mm. Being so near the pupil plane, the detector 610 detects all three colors at comparable intensity levels. The detector 610 can then be defocused, lowering the light level as necessary. In the illustrated embodiment, the light level may be adjusted over two orders of magnitude just by defocusing the detector 610. Third, light incident on the detector 610 is independent of drive-current-dependent laser optical characteristics. In other words, the far field of the laser may be regarded as constant. Finally, placing the detector 610 behind a folding mirror and detecting only light that would otherwise be lost results in no interference with the optical path.

Figure 7:
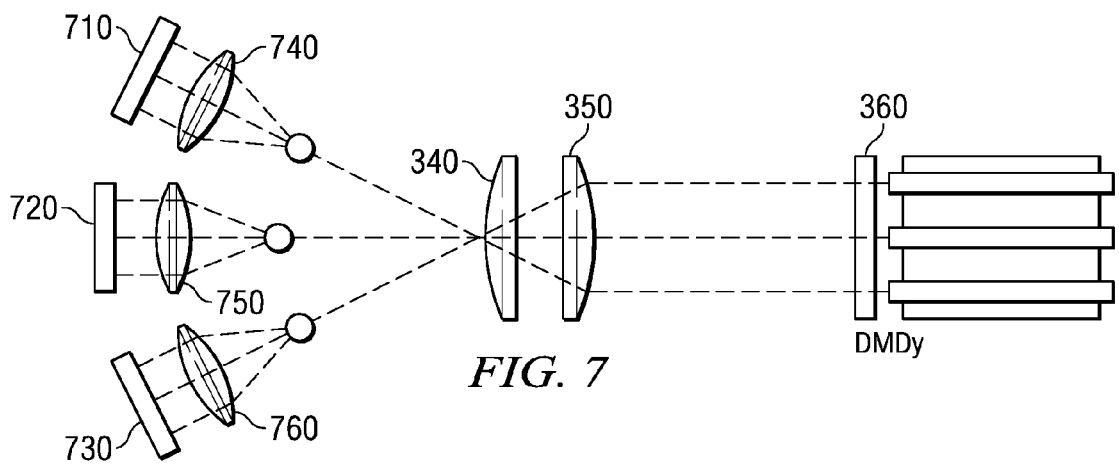
FIG. 7 illustrates a parametric optical layout taken respectively along the XZ plane of another embodiment of a system for generating multicolor scan lines constructed according to the principles of the invention.

FIG. 7 illustrates a parametric optical layout taken respectively along the XZ plane of another embodiment of a system for generating multicolor scan lines constructed according to the principles of the invention. FIG. 7 is presented for the purpose of showing that lasers and optical fibers are not the only light source(s) suitable for the system described herein. For example, multiple, incandescent, colored light sources 710, 720, 730 and focusing lenses 740, 750, 760 that focus on different emission locations may be substituted therefor.

Figure 8:
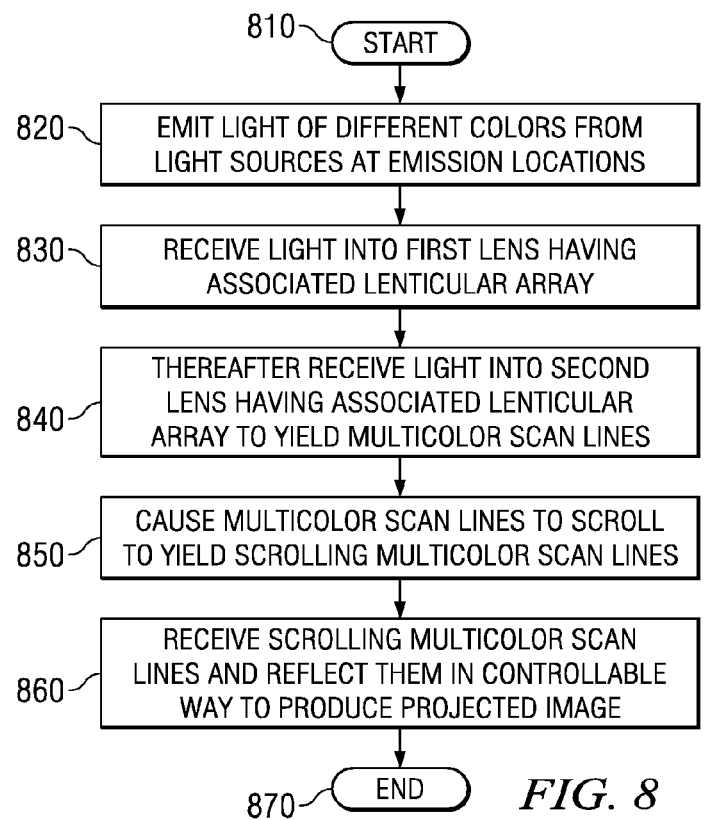
FIG. 8 is a flow diagram of one embodiment of a method of generating multicolor scan lines carried out according to the principles of the invention.

FIG. 8 is a flow diagram of one embodiment of a method of generating multicolor scan lines carried out according to the principles of the invention and embodied in an overall method of producing a projected image. The method of generating multicolor scan lines begins in a start step 810.

In a step 820, light of different colors is emitted from light sources at different emission locations. In a step 830, the light of the different colors is received into a first lens having a lenticular array associated therewith. The emission locations are separated by different distances from the first lens. In a step 840, the light of the different colors is thereafter received into a second lens having a lenticular array associated therewith. Multicolor scan lines may result from these steps being carried out. In a step 850, a polygonal prism may then receive the multicolor scan lines and cause them to scroll. In a step 860, a DMD may then receive the scrolling multicolor scan lines and reflect them in a controllable way to produce a projected image. The overall method of producing a projected image ends in an end step 870.

Those skilled in the art to which the invention relates will appreciate that other and further additions, deletions, substitutions and modifications may be made to the described embodiments without departing from the scope of the invention.

What is claimed is:

1. A method of generating multicolor scan lines, comprising:
emitting light of different colors from light sources including optical fibers at different fiber exit pupil locations aligned in a plane;
receiving the light of the different colors into first and second lenses having a lenticular arrays of convex cylindrical cell elongated orthogonally relative to the plane of the exit pupils and generating correspondingly spatially separated different color scan lines;
wherein axes of the fibers at the fiber exit pupils are angularly tilted radially with respect to one another such that principal rays of light emitted from the exit pupils converge at a focal plane of the second lens; and
wherein at least two of the exit pupil locations are separated by different distances from the first lens; the different distances acting to nullify at least some of a chromatic focal shift dependency in the first and second lenses.

2. The method as recited in claim 1, wherein the second lens provides thed multicolor scan lines to a polygonal prism, and the method further comprises causing principal rays emitted from the ends to converge on an output face of the polygonal prism.

3. The method as recited in claim 1, wherein the different distances are set as a function of colors of the light of the different colors and a chromatic dispersion of the first lens.

4. The method as recited in claim 1, wherein the light sources include lasers.

5. The method as recited in claim 1, wherein the light sources are red, green and blue light sources and the multicolor scan lines are red, green and blue scan lines.

6. The method as recited in claim 1, further comprising:
causing the light of the different colors to reflect off a folding mirror located between the exit pupil locations and the first lens; and
monitoring multicolor light output with a detector located behind the mirror.

7. The method as recited in claim 1, wherein thed different distances are set as a function of the different colors emitted at the exit pupil locations.

8. A multicolor projection video display (PVD), comprising:
at least three light sources that respectively emit light of different colors from different fiber exit pupil locations aligned in a plane;
first and second lenses having lenticular arrays of convex cylindrical cells elongated orthogonally relative to the place of the exit pupils and configured to receive the emitted light of different colors and generate corresponding spatially separated different color scan line;
wherein axis of the fibers at the fiber exit pupils are angularly tilted radially with respect to one another such that principal rays of light emitted from the exit pupils converge on a focal plane of the second lens; and
wherein at least two of the exit pupil locations are separated by different distances from the first lens; the different distances acting to nullify at least some of a chromatic focal shift dependency in the first and second lenses;
a polygonal prism configured to receive the different color scan lines and cause the scan lines to scroll;
a projection lens;
a digital micro-mirror device (DMD) configured to receive and reflect portions of the scan lines toward or away from the projection lens;
DMD control circuitry coupled to the DMD and configured to control the DMD in response to data derived from a video stream; and
a projection screen configured to receive images emitted from the projection lens.

9. The PVD as recited in claim 8, wherein the different distances are set as a function of color of the light of the different colors and a chromatic dispersion of the first lens.

10. The PVD as recited in claim 8, wherein the light sources comprise lasers.

11. The PVD as recited in claim 8, wherein the light sources are red, green and blue light sources and the scan lines are red, green and blue scan lines.

12. The PVD as recited in claim 8, further comprising:
a folding mirror located between the exit pupil locations and the first lens; and
a detector located behind the folding mirror and configured to monitor multicolor light output.

13. The PVD as recited in claim 8, wherein each different distance is set as a function of the different color of light emitted at the exit pupil location.

14. A system for generating multicolor scan lines, comprising:
at least three light sources including optical fibers that respectively emit light of different colors from different fiber exit pupil locations aligned in a plane; and
first and second lenses having lenticular arrays of convex cylindrical cells elongated orthogonally relative to the plane of the exit pupils and configured to receive the emitted light of different colors and generate corresponding spatially separated different color scan lines;
wherein axes of the fibers at the fiber exit pupils are angularly tilted radially with respect to one another such that principal rays of light emitted from the exit pupils converge at a focal plane of the second lens; and
wherein at least two of the exit pupil locations are separated by different distances from the first lens; the different distances acting to nullify at least some of a chromatic focal shift dependency in the first and second lenses.

15. The system of claim 14, wherein the first and second lenses are plastic lenses.

16. The system of claim 15, wherein the principal rays of light emitted from the exit pupils are focused at a face of a polygonal prism which rotates to scroll the scan lines along a light modulating surface of a spatial light modulator.

17. The system of claim 16, wherein the light modulating surface is a mirror surface comprising an array of individually tiltable micromirrors.

18. The system as recited in claim 14, wherein the light sources include lasers.

19. The system as recited in claim 14, wherein the light sources are red, green and blue light sources and the multicolor scan lines are red, green and blue scan lines.

20. The system as recited in claim 14, further comprising:
a folding mirror located between the exit pupil locations and the first lens; and a detector located behind the mirror and configured to monitor multicolor light output.

* * * * *